US012744212B2

(12) United States Patent
Kim et al.

(10) Patent No.: US 12,744,212 B2
(45) Date of Patent: Sep. 22, 2026

(54) SLURRY COMPOSITION FOR SECONDARY BATTERY ELECTRODE AND SECONDARY BATTERY ELECTRODE USING SAME

(71) Applicant: DONGJIN SEMICHEM CO., LTD., Incheon (KR)

(72) Inventors: Seong Do Kim, Hwaseong-si (KR); Dong Ho Kim, Hwaseong-si (KR); Tae Yoon Kim, Hwaseong-si (KR); Hwi Chan Yang, Hwaseong-si (KR); Joo Chul Lee, Hwaseong-si (KR); Hyung Woo Lim, Hwaseong-si (KR)

(73) Assignee: DONGJIN SEMICHEM CO., LTD., Incheon (KR)

( * ) Notice: Subject to any disclaimer, the term of this patent is extended or adjusted under 35 U.S.C. 154(b) by 939 days.

(21) Appl. No.: 18/089,138

(22) Filed: Dec. 27, 2022

(65) Prior Publication Data

US 2023/0137520 A1 May 4, 2023

Related U.S. Application Data

(63) Continuation of application No. PCT/KR2021/008406, filed on Jul. 2, 2021.

(30) Foreign Application Priority Data

Jul. 2, 2020 (KR) ........................ 10-2020-0081708
Jul. 2, 2020 (KR) ........................ 10-2020-0081709

(51) Int. Cl.

| | |
|---|---|
| ***H01M 4/583*** | (2010.01) |
| ***H01M 4/62*** | (2006.01) |
| ***H01M 50/46*** | (2021.01) |
| *H01M 4/02* | (2006.01) |

(52) U.S. Cl.
CPC ........... *H01M 4/583* (2013.01); *H01M 4/622* (2013.01); *H01M 50/46* (2021.01); *H01M 2004/021* (2013.01); *H01M 2004/028* (2013.01)

(58) Field of Classification Search
CPC ........ H01M 4/583; H01M 4/62; H01M 4/622; H01M 50/46
USPC ........................................... 429/218.1, 231.8
See application file for complete search history.

(56) References Cited

FOREIGN PATENT DOCUMENTS

| | | | | | |
|---|---|---|---|---|---|
| KR | 10-2016-0025020 A | | 3/2016 | | |
| KR | 10-1785064 B1 | | 10/2017 | | |
| KR | 10-2018-0075180 A | | 7/2018 | | |
| KR | 20180075180 A | * | 7/2018 | ............ | H01M 4/625 |
| KR | 10-2019-0096649 A | | 8/2019 | | |
| WO | 2020/122602 A1 | | 6/2020 | | |

OTHER PUBLICATIONS

Machine translation of KR 20180075180 A (Year: 2018).*

* cited by examiner

*Primary Examiner* — Kevin P Kerns
(74) *Attorney, Agent, or Firm* — United One Law Group LLC; Kongsik Kim; Jhongwoo Peck

(57) ABSTRACT

A slurry composition for a secondary battery electrode includes a conductive material including a linear carbon material and a point-type carbon material, a dispersant, and an organic solvent. A measurement of a particle size distribution of the conductive material in the slurry composition, measured by a laser diffraction particle size analyzer, exhibits a first peak and a second peak within specific ranges.

15 Claims, 2 Drawing Sheets

(a) Bundle type linear carbon material (b) Semi-bundled linear carbon material (c) Single linear carbon material (a) High-structure point-like carbon materials (HSCB)

(b) Medium-structure point-like carbon material (MSCB)

(c) Low-structure point-like carbon material (LSCB)

SLURRY COMPOSITION FOR SECONDARY BATTERY ELECTRODE AND SECONDARY BATTERY ELECTRODE USING SAME

CROSS-REFERENCE TO RELATED APPLICATIONS

The present application is a Continuation of PCT/KR2021/008406 filed on Jul. 2, 2021, which claims priority from Korean Application No. KR 10-2020-0081708 filed on Jul. 2, 2020 and Korean Application No. KR 10-2020-0081709 filed on Jul. 2, 2020. The aforementioned applications are incorporated herein by reference in their entireties.

TECHNICAL FIELD

Proposed are an antioxidant liquid for a fuel cell and a method for charging the antioxidant liquid into a gas diffusion layer of a fuel cell stack to maintain an antioxidant content at an appropriate level. The antioxidant liquid includes a solvent, an oxide as a first antioxidant dispersed in the solvent, and a slat as a second antioxidant dissolved in the solvent.

BACKGROUND ART

Since secondary batteries first appeared in the 1990s, research on secondary batteries has been continuously conducted and progressed. In the process, auxiliary elements that supplement and improve characteristics of the cathode and anode active materials, electrolyte, and separator, which are the main components of the secondary battery, have been developed. Conductive materials and pre-dispersion slurries are also one of auxiliary elements, and research and development are steadily progressing.

Specifically, the conductive material is a material included in both the cathode and the anode and used to easily move electrons between the active material and the active material or between the active material and the current collector and is mainly being developed around carbon-based materials. The pre-dispersion slurry is a solution in which such a conductive material is dispersed in a solvent and becomes a material constituting a slurry for an electrode together with an active material and a binder in the future. Recently, as secondary batteries entered the market for medium-large sized batteries such as electric vehicles and ESS, their importance is increasing. In particular, among conductive materials, carbon nanotubes (CNT) are rapidly emerging as the main material for conductive materials.

Carbon nanotubes (CNT) have a nano-sized diameter and a cylindrical shape, carbon atoms are arranged in a spiral shape and have an $sp^2$-bonding structure. Based on this structure, carbon nanotubes (CNTs) have attracted attention as a material with excellent physical properties in terms of electrical properties, strength, resilience, and thermal conductivity and are in the spotlight as new materials in various fields.

As a conductive material for secondary batteries, carbon nanotubes (CNTs) can increase energy density and improve lifespan compared to conventional powdered carbon materials and have the advantage of reducing the size of batteries. In particular, these advantages can act as greater advantages in batteries for electric vehicles that require high capacity and rapid charging and discharging.

However, in spite of these advantages, the low solubility and dispersibility of carbon nanotubes (CNTs) are pointed out as problems. In particular, carbon nanotubes (CNTs) exist in a bundle or agglomerate structure in a solution due to strong Van-der-Waals attraction between carbon nanotubes. Accordingly, in the development of conductive materials for secondary batteries using carbon nanotubes (CNTs), the need and importance of technology for dispersing carbon nanotubes (CNTs) is growing, and in particular, a dispersion method for minimizing damage to carbon nanotubes (CNTs) is required.

SUMMARY

In order to overcome the above problems, an objective of the present disclosure is to provide a pre-dispersed slurry composition for secondary battery electrodes having improved solubility and dispersibility of a carbon-based conductive material and excellent electrical properties by adjusting the average size and content of the carbon-based conductive material including linear carbon materials such as carbon nanotubes (CNT).

However, the objectives of the present disclosure are not limited to the above-mentioned objectives, and other objectives not mentioned will be clearly understood by those skilled in the art from the following description.

As a means for achieving the above object, an embodiment of the present disclosure provides a slurry composition for a secondary battery electrode.

The composition includes a conductive material containing a linear carbon material and a point-like carbon material; a dispersant; and an organic solvent, in which the conductive material in the slurry composition exhibits a first peak and a second peak when measuring the particle size distribution of the conductive material in the slurry composition.

In this case, the first peak has a maximum peak value at a particle size range of 0.01 μm or more and less than 1.0 μm, and the second peak may have a maximum peak value at a particle size range of 1.0 μm or more and 20.0 μm or less.

Additionally, the conductive material may include a bundled linear carbon material and a high-structure point-like carbon material (HSCB).

The linear carbon material may further include a semi-bundled linear carbon material and may include a network structure containing a low-structure point-like carbon material (LSCB) and a medium-structure point-like carbon material (MSCB) between the semi-bundled linear carbon materials.

In addition, when measuring the particle size distribution in the slurry composition, the conductive material may satisfy two or more conditions of the following [Conditions 1 to 4]:

[Condition 1] $D10 \leq 0.1$ μm

[Condition 2] 0.1 μm$<D50 \leq 3$ μm

[Condition 3] 3 μm$<D90 \leq 10$ μm

[Condition 4] 10 μm$<Dmax \leq 50$ μm.

In addition, the linear carbon material included in the conductive material may have an average length of 250 μm or less and an average diameter of 40 nm or less.

In addition, the point-like carbon material included in the conductive material may have an average size of 5 nm to 100 nm.

The conductive material may have an average BET-specific surface area in a range of 100 to 500 $m^2/g$.

The linear carbon material may have an average BET-specific surface area in a range of 50 to 500 $m^2/g$.

The point-like carbon material may have an average BET-specific surface area of in a range 50 to 1,600 $m^2/g$.

The content ratio of the linear carbon material and the point-like carbon material may be 55% to 95% by weight: 5% to 45% by weight.

Furthermore, the dispersant may include a rubber-based dispersant including repeating units derived from acrylonitrile-based monomers and olefin-based monomers.

Specifically, the rubber-based dispersant may include one or more compounds containing one or both of repeating units represented by Formula 1 and Formula 2 below:

[Formula 1]

[Formula 2]

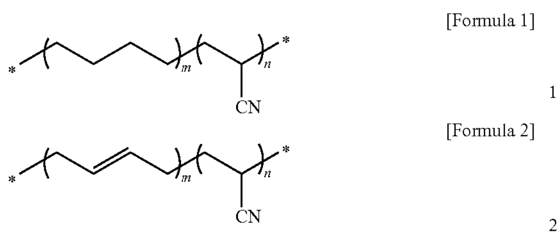

In Formula 1 and Formula 2, m and n are mole fractions of each repeating unit, m+n=1, and m is 0.1 to 0.9.

The slurry composition for a secondary battery electrode, according to the present disclosure, includes a conductive material including a linear carbon material and a point-like carbon material, a dispersant, and an organic solvent. By adjusting the average size and the amount of the conductive material so as to have two peaks within a specific range, it is advantageous in that the solubility and dispersibility of the carbon-based conductive material are improved, and the electrical properties thereof are remarkably improved.

DETAILED DESCRIPTION

Figure 1:
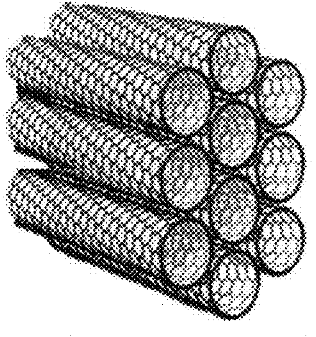
FIG. 1 is an image showing the types of carbon-based conductive materials according to their structures.
Figure 1:
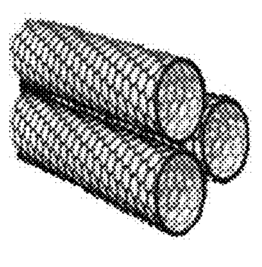
Figure 1:
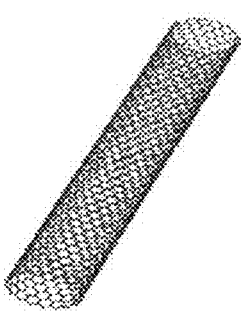
Figure 1:
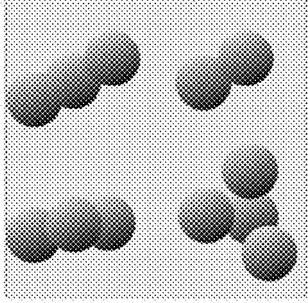
Figure 1:
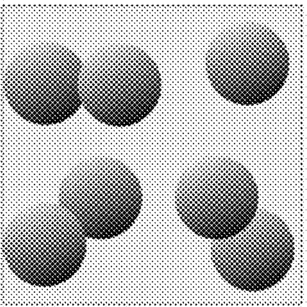

Before describing the present disclosure in detail below, it should be understood that the terms used in the present specification are for describing a specific embodiment and are not intended to limit the scope of the present disclosure, limited only by the scope of the appended patent claim. All technical and scientific terms used herein have the same meaning as commonly understood by those of ordinary skilled in the art unless otherwise stated.

Unless otherwise stated herein, it will be further understood that the terms "comprise", "comprises", and "comprising", when used in this specification, specify the presence of stated features, regions, integers, steps, operations, elements, and/or components but do not preclude the presence or addition of one or more other features, regions, integers, steps, operations, elements, components and/or groups thereof.

Hereinafter, the present disclosure will be described in more detail.

Slurry Composition For Secondary Battery Electrode

In an embodiment, the present disclosure provides a slurry composition for a secondary battery electrode including a carbon-based conductive material, a dispersant, a rubber-based dispersant, and an organic solvent.

The slurry composition for a secondary battery electrode, according to the present disclosure, includes a conductive material, a dispersant, and an organic solvent, in which the conductive material supplements the conductivity of the active material in the electrode of the secondary battery and forms a passage through which electrons can move, and includes a carbon-based conductive material having excellent electrical conductivity. Examples of carbon-based conductive material may include at least one selected from the group consisting of linear carbon material such as a carbon nanotube (CNT), a carbon nanofiber, and a carbon nanorod; and point-like carbon material such as carbon black, ethylene black, acetylene black, Ketjen Black®, channel black, furnace black, lamp black, thermal black, natural graphite, and artificial graphite.

Here, the carbon-based conductive material may satisfy a certain size range. For example, the linear carbon material may have an average length of 250 μm or less and an average diameter of 40 nm or less. Preferably, the linear carbon material may have an average length of 200 μm or less and an average diameter of 5 to 20 nm. In addition, the point-like carbon material may have an average size of 5 to 100 nm, preferably 20 to 80 nm. At this time, the average size of the point-like carbon material may mean an average diameter.

The linear carbon material was measured using a scanning electron microscope (SEM) and a high-resolution transmission electron microscope (HR-TEM). The point-like carbon material can be measured by preparing a dispersion solution using a particle size analyzer (Malvern's model 2000).

The linear carbon material has a problem of poor dispersibility of the slurry composition when the average length of the linear carbon material exceeds 250 μm. When the average size of the point-like carbon material is less than 5 nm, electrical properties deteriorate, and when the average size of the point-like carbon material is more than 100 nm, dispersibility decreases.

In addition, in the carbon-based conductive material, the point-like carbon material connects a short distance in a point-to-point form, whereas the linear carbon material can connect carbon materials spaced apart at a longer distance than the point-like carbon material, thereby easily forming a network structure, and thus the linear carbon material may be included in a high content. As an example, the carbon-based conductive material may be a combination of the linear carbon material and the point-like carbon material.

In this case, the linear carbon material, as shown in FIG. 1, may be of a bundle type, and the point-like carbon material may include a high-structure type carbon material (HSCB). On the other hand, the linear carbon material may further include a semi-bundled linear carbon material, and the semi-bundled linear carbon material may be a linear carbon material in a form in which individual linear carbon materials and two or three individual linear carbon materials are bundled and may include a network structure containing a low-structure point-like carbon material (LSCB) and a medium-structure point-like carbon material (MSCB) between the semi-bundled linear carbon materials. The carbon-based conductive material can further improve the electrical properties of the manufactured electrode by having such a network structure.

In addition, when the conductive material including the linear carbon material and the point-like carbon material is 100% by weight, the content ratio of the linear carbon material and the point-like carbon material is 55% to 95% by weight: 5% to 45% by weight. The content of the linear carbon material may be greater than the content of the point-like carbon material. In the present disclosure, the electrical properties of the slurry composition can be further improved by adjusting the ratio of the linear carbon material and the point-like carbon material as described above. Specifically, the present disclosure may prevent the viscosity of the slurry composition from increasing or the dispersibility and electrical properties from deteriorating by leaving the content ratio of the linear carbon material and the point-like carbon material out of the above range.

Figure 2:
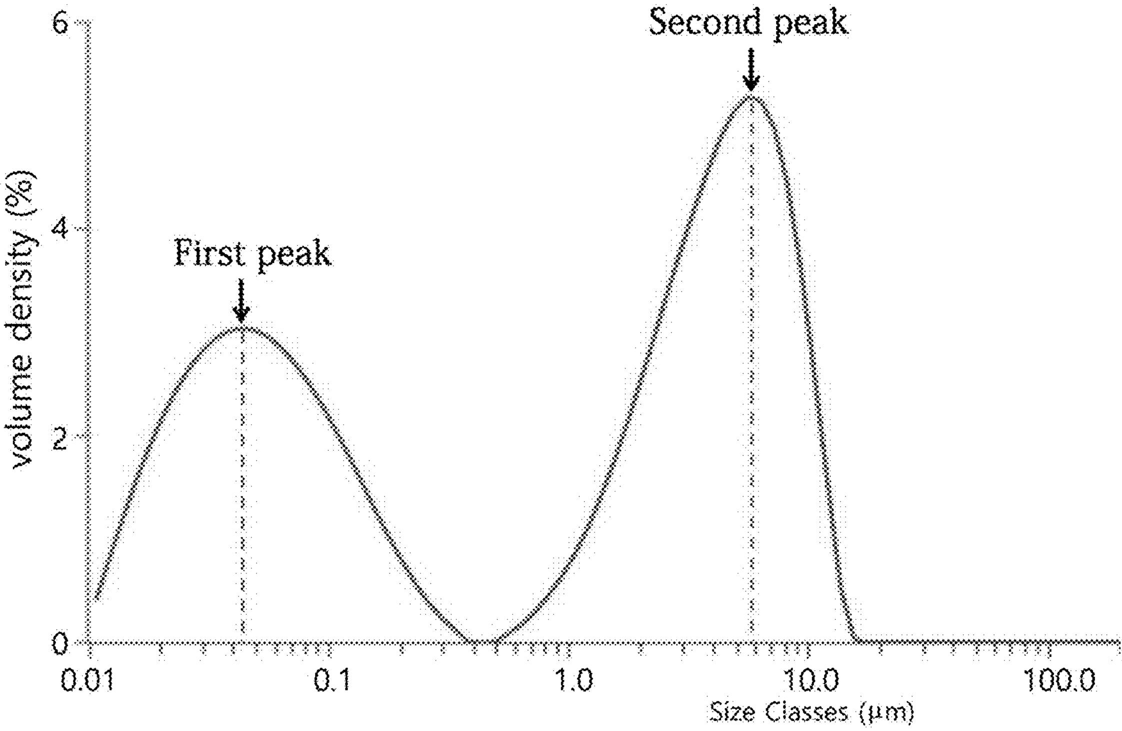
FIG. 2 is a particle size distribution graph obtained by measuring the particle size distribution of the conductive material for the slurry composition for secondary battery electrodes according to the present disclosure.

In addition, when the linear carbon material and the point-like carbon material are used together, the carbon-based conductive material may exhibit the first peak and the second peak within the particle size range of 0.001 to 50.0 μm in the particle size distribution graph, as shown in FIG. 2. The particle size distribution of the conductive material in the slurry composition may be measured using a particle size analyzer of a model 2000 from Malvern. More specifically, the first peak and the second peak may be displayed within a particle size range of 0.001 to 30.0 μm. In this case, the first peak may have a maximum peak value in particle size in a range of 0.01 to 1.0 μm, specifically 0.01 to 0.5 μm, or 0.01 to 0.2 μm. In addition, the second peak may have a maximum peak value in particle size in a range of 1.0 to 20.0 μm, specifically 2.0 to 10.0 μm or 4.0 to 7.0 μm. When the particle size ranges of the first peak and the second peak exceed 1.0 μm and 20.0 μm, the viscosity of the slurry composition increases, and the dispersibility of the carbon-based conductive material deteriorates.

In general, when a slurry composition is formed by using two types of carbon-based conductive materials in combination, their particle size distribution graph shows one peak having the maximum value at the median particle size value of each carbon-based conductive material included in the slurry composition. However, the slurry composition, according to the present disclosure, has two peaks including a first peak and a second peak, and the two peaks identified may have a maximum peak in an inherent particle size range rather than an average particle size value of two types of carbon-based conductive materials. That is, among the two peak values, the first peak may indicate the degree of dispersion of the point-like conductive material, and the second peak may indicate the degree of dispersion of the linear conductive material.

When the diameters and/or lengths of the two types of carbon-based conductive materials are equal to each other, the first peak and the second peak appear at the same position, and the size of the peak may vary according to the content of the carbon-based conductive material. For example, as the content of the point-like conductive material increases, the size of the first peak may increase.

In addition, the carbon-based conductive material not only exhibits the first peak and the second peak as described above in the particle size distribution graph when measuring the particle size distribution of the conductive material for the slurry composition but also two or more of the following conditions [conditions 1 to 4] can be satisfied.

[Condition 1] D10≤0.1 μm

[Condition 2] 0.1 μm<D50≤3 μm

[Condition 3] 3 μm<D90≤10 μm

[Condition 4] 10 μm<Dmax≤50 μm.

In the [Conditions 1 to 4], the D10, the D50, and the D90 represent size values corresponding to 10%, 50%, and 90% with respect to the maximum value in the cumulative particle size distribution when measuring the particle size distribution of the slurry composition with the linear carbon material and the point-like carbon material, and the Dmax is a maximum value in a cumulative particle size distribution and may mean a particle size distribution limit value with respect to the linear carbon material, and as the value increases, dispersibility of the carbon-based conductive material may decrease.

In the present disclosure, the carbon-based conductive material has a D10 of 0.1 μm or less, the D50 is greater than 0.1 μm and less than or equal to 3 μm, the D90 is greater than 3 μm and less than or equal to 10 μm, and by satisfying any two or more of [Conditions 1 to 4] in which the Dmax value is greater than 10 μm and less than or equal to 50 μm, the dispersibility of the linear carbon material and the point-like carbon material may be further improved.

As an example, the carbon-based conductive material has a D10 of 0.01 to 0.03 μm, D50 is 0.5 to 2.5 μm, D90 is 4 to 9 μm, and Dmax is 12 to 16 μm. Therefore, any two or more of the above [Conditions 1 to 4], specifically, all of [Conditions 1 to 4], may be satisfied.

In the present disclosure, when measuring the particle size distribution of the conductive material dispersed in the slurry composition, the dispersibility of the carbon-based conductive material in the slurry composition can be further improved by having the above-described particle size distribution and particle size distribution graph form of the conductive material. Through this, it is possible to further improve the electrical properties of the secondary battery electrode manufactured using the slurry composition.

The conductive material may have an average BET-specific surface area in a range of 100 to 500 $m^2/g$, preferably 250 to 350 $m^2/g$, at 23° C. According to the present disclosure, the slurry composition is dried, and then the average BET-specific surface area of the conductive material present in the dried slurry composition is adjusted within the above range, thereby facilitating electron transfer of the prepared electrode even when a small amount of the conductive material is included in the slurry composition.

The average BET-specific surface area is the average value of the BET-specific surface area of the conductive material including the linear carbon material and the point-like carbon material. By adjusting the average BET-specific surface area within the above range, it is possible to prevent the problem of lowering electrical properties when the BET-specific surface area is less than 100 $m^2/g$ and the problem of increasing viscosity and decreasing dispersibility of the slurry composition when the BET-specific surface area is more than 500 $m^2/g$.

At this time, the linear carbon material may have an average BET-specific surface area in a range of 50 to 500 $m^2/g$, and the point-like carbon material may have an average BET-specific surface area in a range of 50 to 1,600 $m^2/g$. Preferably, the linear carbon material may have an average BET-specific surface area in a range of 150 to 400 $m^2/g$ or 250 to 350 $m^2/g$, and the point-like carbon material may have an average BET-specific surface area in a range of 600 to 1500 $m^2/g$.

As an example, the conductive material may include a linear carbon material having an average BET-specific surface area in a range of 280 to 320 $m^2/g$ and a point-like carbon material having an average BET-specific surface area in a range of 790 to 810 $m^2/g$ or 1350 to 1450 $m^2/g$.

The linear carbon material has a problem in that the electrical conductivity of the slurry composition is lowered when the average BET-specific surface area is less than the above range, and when the above range is exceeded, the electrical conductivity is increased to improve the electrical properties of the slurry composition. However, since the dispersibility of the conductive material having a trade-off relationship with the electrical conductivity of the conductive material is lowered, the binding property of the conductive material and the electrode active material is lowered during the manufacture of an electrode for a secondary battery, thereby limiting durability.

In addition, when the point-like carbon material is less than the above-described average BET-specific surface area range, the particle size of the carbon material increases, and the initial dispersibility may be reduced, and when BET-specific surface area of the point-like carbon material exceeds the above range, there is a problem of causing an increase in the viscosity of the slurry composition due to re-agglomeration of the conductive material.

In addition, the slurry composition, according to the present disclosure, may exhibit a viscosity in a range of 100 to 2,000 cps, preferably 100 to 1,500 cps, at a shear rate of 23° C. and 50 $S^{-1}$ when measuring viscosity using a rheometer.

When the viscosity of the slurry composition is less than 100 cps at a shear rate of 50 $S^{-1}$, the dispersibility of the carbon-based conductive material is degraded, and when the viscosity is more than 2,000 cps, the viscosity of the slurry composition is too high to degrade workability during manufacture.

Meanwhile, the dispersant used in the slurry composition for a secondary battery electrode, according to the present disclosure, may include a rubber-based dispersant including a repeating unit derived from an acrylonitrile-based monomer and an olefin-based monomer. Specifically, the rubber-based dispersing agent may include repeating units obtained by copolymerizing an acrylonitrile-based monomer, such as acrylonitrile or methacrylonitrile; and olefine-based monomers, such as 1,3-butadiene, isoprene, 2,3-dimethyl-1,3-butadiene, 1,3-pentadiene, 1,4-pentadiene, 1,4-hexadiene, ethylene, propylene, and 1-butene. For example, the rubber-based dispersing agent may include one or more of compounds that contain one or both of repeating units represented by Formula 1 and Formula 2 below:

[Formula 1]

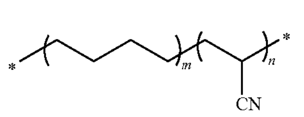

[Formula 2]

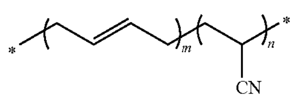

In Formula 1 and Formula 2, m and n are mole fractions of each repeating unit, m+n=1, and m is 0.1 to 0.9.

As an example, the rubber-based dispersing agent may include a hydrogenated nitrile butadiene rubber dispersant (HNBR) alone with a repeating unit represented by Formula 1, or a hydrogenated nitrile-butadiene rubber dispersant having a repeating unit of Chemical Formula 1 and a nitrile-butadiene rubber dispersant having a repeating unit of Chemical Formula 2.

The rubber-based dispersant may serve as a stabilizer when dispersing the carbon-based conductive material in the slurry composition and may also serve as a binder in a battery when manufacturing an electrode. To this end, the average molecular weight of the rubber-based dispersing agent may be in a range of 50,000 to 200,000 g/mol, preferably 50,000 to 180,000 g/mol.

In addition, the content of the rubber-based dispersing agent may be 0.1% to 10% by weight based on the total weight of the composition, preferably 0.5% to 3% by weight based on the total weight of the composition. The present disclosure can maximize the effect of uniformly dispersing the carbon-based conductive material without losing the stability of viscosity and electrical properties of the slurry composition by adjusting the content of the rubber-based dispersant within the above range. Specifically, when the content of the rubber-based dispersing agent is less than 1% by weight, the viscosity of the slurry composition increases, and the dispersibility of the carbon-based conductive material decreases, and when the content of the fluorine-based dispersing agent is more than 10% by weight, there is a limitation in that the viscosity stability and electrical properties of the cured product prepared using the slurry composition are degraded.

Furthermore, the organic solvent used in the slurry composition for secondary battery electrodes, according to the present disclosure, may include at least one selected from the group consisting of N-methyl pyrrolidone (NMP), dimethyl sulfoxide (DMSO), isopropyl alcohol (IPA), acetone, and water, preferably may include N-methyl pyrrolidone (NMP).

Electrodes For Secondary Batteries

Furthermore, in another aspect, the present disclosure provides an electrode for a secondary battery manufactured using the slurry composition for a secondary battery electrode.

The electrode for a secondary battery, according to the present disclosure, may be manufactured by mixing the electrode active material with the slurry composition for a secondary battery electrode of this disclosure, which includes a carbon-based conductive material, a rubber-based dispersant, and an organic solvent, coating at least one surface of an electrode current collector, and drying and roll pressing thereof.

As an example, the electrode for a secondary battery may be a cathode for a secondary battery, and in this case, the electrode active material may be a lithium transition metal oxide commonly used as a cathode active material. Specifically, the cathode active material includes: a layered compound such as lithium cobalt oxide ($LiCoO_2$) or lithium nickel oxide ($LiNiO_2$), or a compound substituted with one or more transition metals; lithium manganese oxides such as $Li_{1+x1}Mn_{2-x1}O_4$ (where x1 is 0 to 0.33), $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni site type lithium nickel oxide represented by the chemical formula $LiNi_{1-x2}M^1_{x2}O_2$ (where M1=Co, Mn, Al, Cu, Fe, Mg, B, or Ga, and x2=0.01 to 0.3); lithium manganese composite oxide represented by the formula $LiMn_{2-x3}M^2_{x3}O_2$ (where M2=Co, Ni, Fe, Cr, Zn, or Ta and x3=0.01 to −0.1) or $Li_2Mn_3M_3O_8$ (where M3=Fe, Co, Ni, Cu, or Zn); lithium manganese composite oxide with a spinel structure represented by $LiNi_{x4}Mn_{2-x4}O_4$ (where x4=0.01 to 1); $LiMn_2O_4$ in which Li part of the formula is substituted with an alkaline earth metal ion; disulfide compounds; $Fe_2(MoO_4)_3$, but are not limited only thereto.

In addition, since the slurry composition for secondary battery electrodes is substantially the same as the above-described configuration, duplicate descriptions are omitted.

In addition, the electrode current collector of the electrode is not particularly limited as long as the electrode current collector has conductivity without causing a chemical change in the battery and may use, for example, stainless-steel, aluminum, nickel, titanium, sintered carbon, or stainless-steel surface-treated with carbon, nickel, titanium, silver, etc. In addition, the current collector may have a thickness of typically in a range of 3 to 500 μm, and the adhesive force of the cathode active material may be increased by providing fine irregularities on the surface thereof. Such current collectors may be used in various forms, such as films, sheets, foils, nets, porous materials, foams, and nonwoven fabrics.

Secondary Battery

Furthermore, in another aspect, the present disclosure provides a secondary battery including a cathode prepared using the above-described slurry composition for a secondary battery electrode and a cathode active material.

The secondary battery, according to the present disclosure, includes the above-described secondary battery electrode, specifically, the cathode manufactured using the slurry composition for a secondary battery electrode and the cathode active material of the present disclosure and has excellent rapid charge/discharge characteristics and battery-life characteristics.

At this time, the secondary battery includes a cathode, an anode positioned opposite to the cathode, and a separator interposed between the cathode and the anode, and the cathode is as described above. In addition, the secondary battery may further include a battery container accommodating electrode assembly of a cathode, an anode, and a separator, and a sealing member sealing the battery container.

Specifically, the anode may include an anode current collector and an anode active material layer positioned on the anode current collector.

Here, a compound capable of reversible intercalation and deintercalation of lithium may be used as the anode active material. For example, the anode active material may include carbonaceous materials such as an artificial graphite, a natural graphite, a graphitized carbon fiber, and an amorphous carbon; metallic compounds capable of being alloyed with lithium, such as Si, Al, Sn, Pb, Zn, Bi, In, Mg, Ga, Cd, Si alloys, Sn alloys, or Al alloys; metal oxides capable of doping and undoping lithium, such as $SiO_\beta$ ($0<\beta<2$), $SnO_2$, vanadium oxide, and lithium vanadium oxide; or a composite including the metallic compound and the carbonaceous material, such as a Si—C composite or an Sn—C composite, and any one or a mixture of two or more of these may be used. In addition, a metal lithium thin film may be used as the anode active material. In addition, as the carbon material, both low crystalline carbon and high crystalline carbon may be used. Soft carbon and hard carbon are typical examples of low crystalline carbon, and as a high crystalline carbon, high-temperature calcined carbon such as amorphous, platy, scaly, spherical, or fibrous natural graphite or artificial graphite, or kish graphite, pyrolytic carbon, mesophase pitch-based carbon fiber, meso-carbon microbeads, mesophase pitches, and petroleum or coal tar pitch derived cokes is representative.

In addition, the anode current collector is not particularly limited as long as the anode current collector does not cause chemical changes in the battery and has high conductivity. For example, copper, stainless steel, aluminum, nickel, titanium, fired carbon, copper or stainless-steel surface-treated with carbon, nickel, titanium, silver, etc., may be used. In addition, the anode current collector may generally have a thickness of 3 μm to 500 μm, and like the cathode current collector, fine irregularities may be formed on the surface of the current collector to enhance the binding force of the anode active material. For example, the anode current collector may be used in various forms, such as films, sheets, foils, nets, porous materials, foams, and nonwoven fabrics.

Furthermore, the separator separates the anode and the cathode and provides a movement path for lithium ions and may be used without particular limitation as long as it is generally used as a separator in a lithium secondary battery, and in particular, may have a low resistance to ion migration of the electrolyte and excellent electrolyte-moisturizing ability. Specifically, a porous polymer film prepared from a polyolefin-based polymer such as an ethylene homopolymer, a propylene homopolymer, an ethylene/butene copolymer, an ethylene/hexene copolymer, and an ethylene/methacrylate copolymer may be used, or a laminate structure of two or more thereof. In addition, a conventional porous nonwoven fabric, for example, a nonwoven fabric made of high melting point glass fiber, polyethylene terephthalate fiber, or the like, may be used. In addition, a coated separator containing a ceramic component or a polymer material may be used to secure heat resistance or mechanical strength and may be selectively used in a single-layer or multi-layer structure.

Hereinafter, the present disclosure will be described in more detail through examples. However, the following examples are provided to explain the present disclosure in more detail, and the scope of the present disclosure is not limited by the following examples. The following examples can be appropriately modified and changed by those skilled in the art within the scope of the present disclosure.

<Preparation of Slurry Composition>

The slurry compositions of Examples 1 to 29 and Comparative Examples 1 to 4 according to the above slurry composition were prepared, as shown in Table 1 below.

TABLE 1

| | Slurry composition(wt %) | | | | Dispersion particle size (μm) | | | | | |
|---|---|---|---|---|---|---|---|---|---|---|
| Division | Linear carbon material | Point-like carbon material | Dispersant | Solvent | First peak | Second peak | $D_{10}$ | $D_{50}$ | $D_{90}$ | $D_{max}$ |
| Example 1 | 3 | 2 | 25 | 70 | 0.02 | 7.80 | 0.02 | 2.27 | 7.13 | 12.70 |
| Example 2 | 3 | 2 | 25 | 70 | 0.03 | 6.90 | 0.02 | 2.12 | 6.92 | 13.20 |
| Example 3 | 3.5 | 1.5 | 20 | 75 | 0.03 | 7.40 | 0.02 | 1.87 | 6.54 | 11.20 |
| Example 4 | 3.5 | 1.5 | 20 | 75 | 0.02 | 8.20 | 0.02 | 1.81 | 7.81 | 14.40 |
| Example 5 | 3 | 2 | 25 | 70 | 0.68 | 34.20 | 0.72 | 6.12 | 38.42 | 86.10 |
| Example 6 | 3 | 2 | 25 | 70 | 0.92 | 45.40 | 0.94 | 7.24 | 47.21 | 104.50 |
| Example 7 | 3 | 2 | 25 | 70 | 0.02 | 0.4 | 0.01 | 0.02 | 0.56 | 6.54 |
| Example 8 | 3 | 2 | 25 | 70 | 0.02 | 13.58 | 1.62 | 8.21 | 14.20 | 20.10 |
| Example 9 | 3 | 2 | 25 | 70 | 0.3 | 18.12 | 1.92 | 9.86 | 19.24 | 30.40 |
| Example 10 | 3 | 2 | 25 | 70 | 0.9 | 24.28 | 2.49 | 12.74 | 26.12 | 45.20 |
| Example 11 | 3 | 2 | 25 | 70 | — | — | — | — | — | — |
| Example 12 | 3 | 2 | 25 | 70 | — | — | — | — | — | — |

TABLE 1-continued

| | Slurry composition(wt %) | | | | Dispersion particle size (μm) | | | | | |
|---|---|---|---|---|---|---|---|---|---|---|
| Division | Linear carbon material | Point-like carbon material | Dispersant | Solvent | First peak | Second peak | $D_{10}$ | $D_{50}$ | $D_{90}$ | $D_{max}$ |
| Example 13 | 3 | 2 | 25 | 70 | — | — | — | — | — | — |
| Example 14 | 3 | 2 | 25 | 70 | — | — | — | — | — | — |
| Example 15 | 3 | 2 | 25 | 70 | — | — | — | — | — | — |
| Example 16 | 3 | 2 | 25 | 70 | — | — | — | — | — | — |
| Example 17 | 3 | 2 | 25 | 70 | — | — | — | — | — | — |
| Example 18 | 3 | 2 | 25 | 70 | — | — | — | — | — | — |
| Example 19 | 3 | 2 | 25 | 70 | — | — | — | — | — | — |
| Example 20 | 3 | 2 | 25 | 70 | — | — | — | — | — | — |
| Example 21 | 3 | 2 | 25 | 70 | — | — | — | — | — | — |
| Example 22 | 3 | 2 | 25 | 70 | — | — | — | — | — | — |
| Example 23 | 3 | 2 | 25 | 70 | — | — | — | — | — | — |
| Example 24 | 2.34 | 1.92 | 20 | 75.74 | — | — | — | — | — | — |
| Example 25 | 3 | 1.28 | 20 | 75.72 | — | — | — | — | — | — |
| Example 26 | 3.64 | 0.64 | 20 | 75.72 | — | — | — | — | — | — |
| Example 27 | 4.06 | 0.2 | 20 | 75.74 | — | — | — | — | — | — |
| Example 28 | 1.72 | 2.58 | 20 | 75.7 | — | — | — | — | — | — |
| Example 29 | 4.2 | 0.08 | 20 | 75.72 | — | — | — | — | — | — |
| Comparative Example 1 | 5 | 0 | 25 | 70 | — | 28.52 | 7.87 | 18.50 | 36.40 | 58.80 |
| Comparative Example 2 | 3 | 2 | 25 | 70 | 0.00 | 54.00 | 6.53 | 34.20 | 65.40 | 98.10 |
| Comparative Example 3 | 0 | 5 | 20 | 75 | 0.02 | — | 0.17 | 0.05 | 0.59 | 5.90 |
| Comparative Example 4 | 3.5 | 1.5 | 20 | 75 | 0.00 | 62.00 | 7.53 | 24.70 | 78.20 | 94.80 |

TABLE 2

| Division | Linear carbon material, point-like carbon material mixed BET-specific surface area ($m^2/g$) | Linear carbon material BET-specific surface area ($m^2/g$) | Entangled linear carbon material BET-specific surface area ($m^2/g$) | Point-like carbon material BET-specific surface area ($m^2/g$) |
|---|---|---|---|---|
| Example 1 | 192 | — | — | — |
| Example 2 | 198 | — | — | — |
| Example 3 | 205 | — | — | — |
| Example 4 | 208 | — | — | — |
| Example 5 | 195 | — | — | — |
| Example 6 | 197 | — | — | — |
| Example 7 | 195 | — | — | — |
| Example 8 | 192 | — | — | — |
| Example 9 | 198 | — | — | — |
| Example 10 | 198 | — | — | — |
| Example 11 | 100 | — | — | — |
| Example 12 | 500 | — | — | — |
| Example 13 | 50 | — | — | — |
| Example 14 | 600 | — | — | — |
| Example 15 | — | 20 | — | 93 |
| Example 16 | — | 50 | — | 93 |
| Example 17 | — | 500 | — | 93 |
| Example 18 | — | 600 | — | 93 |
| Example 19 | — | — | 85 | 93 |
| Example 20 | — | 221 | — | 20 |
| Example 21 | — | 221 | — | 50 |
| Example 22 | — | 221 | — | 1600 |
| Example 23 | — | 221 | — | 1800 |
| Example 24 | 184 | 218 | — | 93 |
| Example 25 | 196 | 228 | — | 98 |
| Example 26 | 212 | 224 | — | 92 |
| Example 27 | 228 | 232 | — | 97 |
| Example 28 | 171 | 212 | — | 93 |
| Example 29 | 225 | 234 | — | 92 |
| Comparative Example 1 | — | 232 | — | — |
| Comparative Example 2 | 198 | — | — | — |

TABLE 2-continued

| Division | Linear carbon material, point-like carbon material mixed BET-specific surface area ($m^2/g$) | Linear carbon material BET-specific surface area ($m^2/g$) | Entangled linear carbon material BET-specific surface area ($m^2/g$) | Point-like carbon material BET-specific surface area ($m^2/g$) |
|---|---|---|---|---|
| Comparative Example 3 | — | — | — | 95 |
| Comparative Example 4 | 208 | — | — | — |

Referring to Tables 1 and 2, Examples 1 to 4, Examples 11 to 12, Examples 16 to 17, Examples 21 to 22, and Examples 24 to 27 are cases where the first peak, second peak, D10, D50, D90, Dmax satisfies the content ratio between the linear carbon material and the point-like carbon material, Examples 5 to 10, Examples 13 to 15, Examples 18 to 20, Examples 23 and Examples 28 to 29 are cases where the first peak, the second peak, D10, D50, D90, and Dmax do not satisfy the range of the content ratio between the linear carbon material and the point-shaped carbon material. Comparative Examples 1 and 3 include only one type of the linear carbon material or the point-like carbon material, and Comparative Examples 2 and 4 include two types of the linear carbon material and the point-like carbon material, but both a first peak and a second peak are not shown.

Experimental Example 1: Viscosity Measurement of Slurry Composition

In Table 3, the viscosity of the slurry composition was measured at 50 $s^{-1}$ using a Haake Viscometer (Plate Φ35 mm) at 23° C., and the slurry composition was coated on a PET film with a thickness of 7 to 8 μm using a bar coater. The coated PET film was dried at 120° C. for 5 minutes to prepare a measurement specimen. The sheet resistance of each measurement specimen was measured with Mitsubishi Chemical Corporation, Loresta-AX, MCP-T700, using a 4-point-probe method.

TABLE 3

| Division | Viscosity (cP, 23° C.) | Sheet resistance (Ω/sq) |
| --- | --- | --- |
| Example 1 | 680 | 82 |
| Example 2 | 652 | 86 |
| Example 3 | 942 | 75 |
| Example 4 | 983 | 73 |
| Example 5 | 1862 | 102 |
| Example 6 | 1982 | 108 |
| Example 7 | 612 | 104 |
| Example 8 | 1552 | 92 |
| Example 9 | 1641 | 93 |
| Example 10 | 1605 | 91 |
| Example 11 | 521 | 89 |
| Example 12 | 1428 | 68 |
| Example 13 | 221 | 108 |
| Example 14 | 1987 | 64 |
| Example 15 | 142 | 109 |
| Example 16 | 189 | 89 |
| Example 17 | 1345 | 78 |
| Example 18 | 1524 | 74 |
| Example 19 | 202 | 109 |
| Example 20 | 632 | 91 |
| Example 21 | 662 | 82 |
| Example 22 | 812 | 84 |
| Example 23 | 1654 | 82 |
| Example 24 | 821 | 59 |
| Example 25 | 998 | 50 |
| Example 26 | 1256 | 43 |
| Example 27 | 1466 | 38 |
| Example 28 | 653 | 101 |
| Example 29 | 1624 | 33 |
| Comparative Example 1 | 3647 | 128 |
| Comparative Example 2 | 4254 | 132 |
| Comparative Example 3 | 68 | Non-coating |
| Comparative Example 4 | 3825 | 138 |

Referring to Table 3, it was confirmed that the viscosity was 1,500 cP or less, and the sheet resistance was 90 Ω/sq or less in Examples 1 to 4, Examples 11 to 12, Examples 16 to 17, Examples 21 to 22, and Examples 24 to 27. It was confirmed that in the case of Examples 5 to 10, Examples 13 to 15, Examples 18 to 20, Examples 23 and 28 to 29, the viscosity is 2,000 cP or less, and the sheet resistance is 100 Ω/sq or less is higher than in Examples 1 to 4, Examples 11 to 12, Examples 16 to 17, Examples 21 to 22, and Examples 24 to 27.

In the case of Comparative Examples 1, 2, and 4, it was confirmed that the viscosity exceeded 2,000 cP and the sheet resistance also exceeded 110 Ω/sq.

In the case of Comparative Example 3, the viscosity was as low as 68 cP, but it was confirmed that the coating was impossible because the viscosity was too low.

Since the secondary battery, according to the present disclosure, stably exhibits excellent discharge capacity, output characteristics, and capacity retention rate, including a cathode prepared using the above-described slurry composition, and the secondary battery is useful in portable devices such as mobile phones, laptops, digital cameras, and electric vehicles such as hybrid electric vehicles (HEVs).

The invention claimed is:

1. A slurry composition for a secondary battery electrode, the composition comprising:

a conductive material containing a linear carbon material and a point-like carbon material;

a dispersant; and an organic solvent, wherein a measurement of a particle size distribution of the conductive material in the slurry composition, measured by a laser diffraction particle size analyzer, exhibits a first peak and a second peak, wherein the first peak has a maximum peak value at a particle size range equal to or greater than about 0.01 μm and equal to or less than about 1.0 μm, and wherein the second peak has a maximum peak value at a particle size range equal to or greater than about 1.0 μm and equal to or less than about 20.0 μm.

2. The composition of claim 1, wherein the composition satisfies at least two of the following conditions 1 to 4 when measuring the particle size distribution of the conductive material in the slurry composition:

[Condition 1] D10≤0.1 μm

[Condition 2] 0.1 μm<D50≤3 μm

[Condition 3] 3 μm<D90≤10 μm

[Condition 4] 10 μm<Dmax≤50 μm.

3. The composition of claim 1, wherein the linear carbon material has an average length equal to or less than about 250 μm and an average diameter equal to or less than about 40 nm.

4. The composition of claim 1, wherein the conductive material has an average BET-specific surface area in a range of about 100 to about 500 $m^2/g$.

5. The composition of claim 1, wherein the linear carbon material has an average BET-specific surface area in a range of about 50 to about 500 $m^2/g$.

6. The composition of claim 1, wherein the point-like carbon material has an average BET-specific surface area in a range of about 50 to about 1,600 $m^2/g$.

7. The composition of claim 1, wherein the content ratio of the linear carbon material and the point-like carbon material is in a range of about 55%:45% to about 95%:5% by weight.

8. The composition of claim 1, wherein the point-like carbon material has an average size in a range of about 5 to about 100 nm.

9. The composition of claim 1, wherein the dispersant comprises a rubber-based dispersant comprising repeating units derived from acrylonitrile-based monomers and olefin-based monomers.

10. The composition of claim 9, wherein the rubber-based dispersant comprises one or more of compounds comprising one or both of repeating units represented by Formula 1 and Formula 2 below:

[Formula 1]

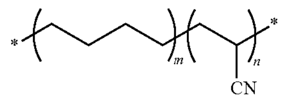

[Formula 2]

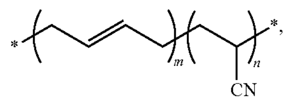

wherein, in Formulae 1 and 2, m and n are mole fractions of each repeating unit, m+n=1, and m is 0.1 to 0.9.

11. The composition of claim 9, wherein the rubber-based dispersant has an average molecular weight in a range of about 50,000 to about 200,000 g/mol.

12. The composition of claim 9, wherein the content of the rubber-based dispersant is in a range of about 0.1% to about 10% by weight.

13. The composition of claim 1, wherein the organic solvent comprises at least one selected from the group consisting of N-methyl pyrrolidone (NMP), dimethyl sulfoxide (DMSO), isopropyl alcohol (IPA), acetone, and water.

14. A secondary battery electrode manufactured using the slurry composition of claim 1.

15. A secondary battery comprising:

a cathode manufactured using a cathode active material and the slurry composition of claim 1;

an anode; and a separator.

* * * * *